US005731523A

United States Patent [19]

Cusumano et al.

[11] Patent Number: 5,731,523

[45] Date of Patent: Mar. 24, 1998

[54] HOSE FATIGUE INDICATOR

[75] Inventors: David A. Cusumano, Plymouth; William K. Boyd, Dexter, both of Mich.

[73] Assignee: Aeroquip Corporation, Maumee, Ohio

[21] Appl. No.: 620,438

[22] Filed: Mar. 22, 1996

(Under 37 CFR 1.47)

[51] Int. Cl.$^{6}$ .............................. G01N 19/06; G01L 7/00

[52] U.S. Cl. ................................ 73/783; 73/709; 138/212

[58] Field of Search .............................. 73/783, 700, 709, 73/760; 116/281, 283, DIG. 27, 200, 208, 212; 138/36

[56] References Cited

U.S. PATENT DOCUMENTS

| | | | |
|---|---|---|---|
| 3,960,456 | 6/1976 | Norris | 116/208 |
| 4,606,391 | 8/1986 | Achterholt | 73/146.8 |
| 4,617,822 | 10/1986 | Davis | 138/36 |
| 4,655,159 | 4/1987 | McMills | 116/212 |
| 4,700,742 | 10/1987 | Rosaen | 137/557 |
| 4,729,403 | 3/1988 | Roche | 137/559 |
| 4,945,948 | 8/1990 | Fischer et al. | 137/559 |
| 5,012,840 | 5/1991 | Betzler | 137/559 |
| 5,125,269 | 6/1992 | Horst, Jr. | 73/323 |
| 5,127,433 | 7/1992 | Argyle et al. | 137/559 |
| 5,181,536 | 1/1993 | Argyle et al. | 137/559 |
| 5,253,674 | 10/1993 | Argyle et al. | 137/559 |
| 5,267,670 | 12/1993 | Foster | 222/1 |
| 5,271,901 | 12/1993 | Issel et al. | 422/83 |
| 5,287,913 | 2/1994 | Dunning et al. | 165/26 |
| 5,335,535 | 8/1994 | Ruthrof et al. | 73/40.7 |
| 5,343,738 | 9/1994 | Skaggs | 73/40.5 |
| 5,373,729 | 12/1994 | Seigeot | 73/49.3 |
| 5,383,338 | 1/1995 | Bowsky et al. | 62/125 |
| 5,402,110 | 3/1995 | Oliver et al. | 340/605 |
| 5,537,950 | 7/1996 | Ou-Yang | 116/283 |

*Primary Examiner*—George M. Dombroske

*Assistant Examiner*—Max H. Noori

*Attorney, Agent, or Firm*—Emch, Schaffer, Schaub & Porcello Co., L.P.A.

[57] ABSTRACT

A hose fatigue indicator including a hose fitting defining an opening. A fracturable diaphragm is positioned adjacent the opening. The diaphragm is in communication with fluid flowing through the fitting. The diaphragm fractures upon exceeding a predetermined fatigue limit due to exposure to the fluid flowing through the fitting. Indicator means provides an indication that the diaphragm has fractured.

18 Claims, 5 Drawing Sheets

HOSE FATIGUE INDICATOR

BACKGROUND OF THE INVENTION

The present invention relates to a hose fatigue indicator. More specifically, the invention is directed to an integral indicator for a hose assembly that indicates the status of the useful life of a hose.

Hoses are used to direct and contain fluid in a variety of applications. Hoses can wear over time due to such factors as pressure, temperature and fluid cycles. This wear can cause a hose to fail thereby causing a leak. In the past, hose failure has been difficult if not impossible to predict. Therefore, unexpected hose failure has caused many problems including damage to machines to which the failed hose is attached, and unscheduled down time of machines while failed hoses are being replaced.

It has been found that there is a need for a hose fatigue indicator that can provide an indication when a hose is nearing the end of its useful life so that the hose can be replaced prior to failure. The present invention satisfies this need.

SUMMARY OF THE INVENTION

The present invention is directed to a hose fatigue indicator that includes a hose fitting defining an opening. The hose fitting is attached to a hose. A fracturable diaphragm is positioned in the opening. The diaphragm is in communication with fluid flowing through the fitting and the hose. The diaphragm fractures upon exceeding a predetermined fatigue limit due to exposure to the fluid. Indicator means, such as an indicator pin, is in communication with the diaphragm. Once the diaphragm fractures, the indicator means provides a visual or auditory indication of such fracture. The actuation of the indicator means provides an indication that the hose to which the hose fitting is attached should be replaced because it is approaching the end of its useful life.

It is the primary object of the present invention to provide a hose fatigue indicator.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
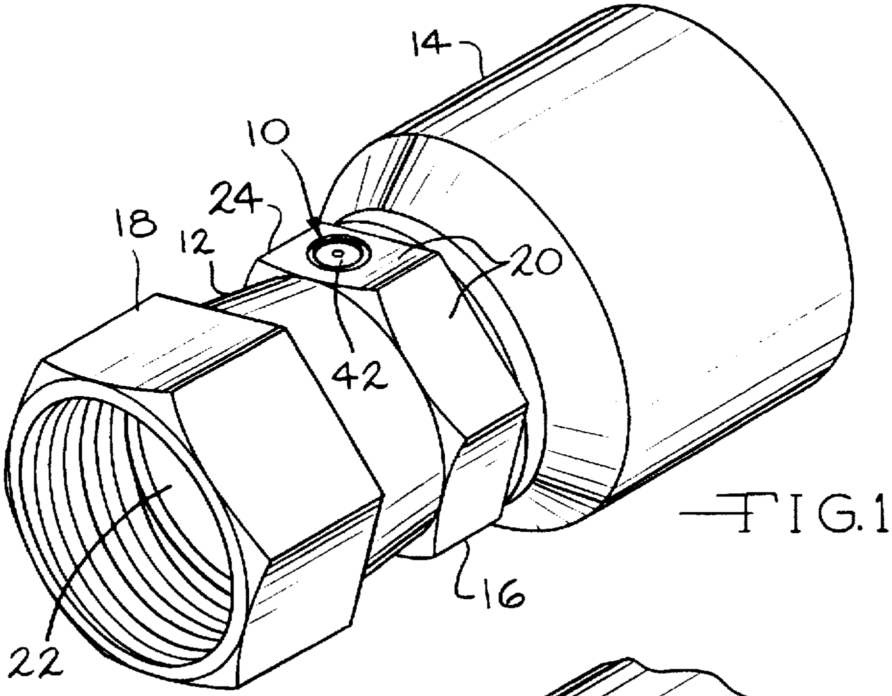
FIG. 1 is a perspective view of a hose fitting incorporating the hose fatigue indicator according to the present invention in which the indicator pin is in a first or down position.

The preferred embodiments and best mode of the present invention will now be described in detail with reference being made to the drawings. The hose fatigue indicator of the present invention is identified in the drawings by the reference number "10".

Referring to FIGS. 1 through 4, the hose fatigue indicator 10 is mounted in a hose fitting 12 that includes a collar 14, a hex nut 16 and a connector 18. The collar 14 can receive a hose (not shown). The connector 18 can be attached to another fitting (not shown). The hex nut 16 is fixedly attached to the collar 14. The hex nut 16 includes a plurality of wrench flats 20. The fitting 12 includes an interior surface 22 and an exterior surface 24. Fluid flows along the interior surface 22 of the fitting 12. The fitting 12 can be made from a variety of materials, with metal being preferred.

Figure 3:
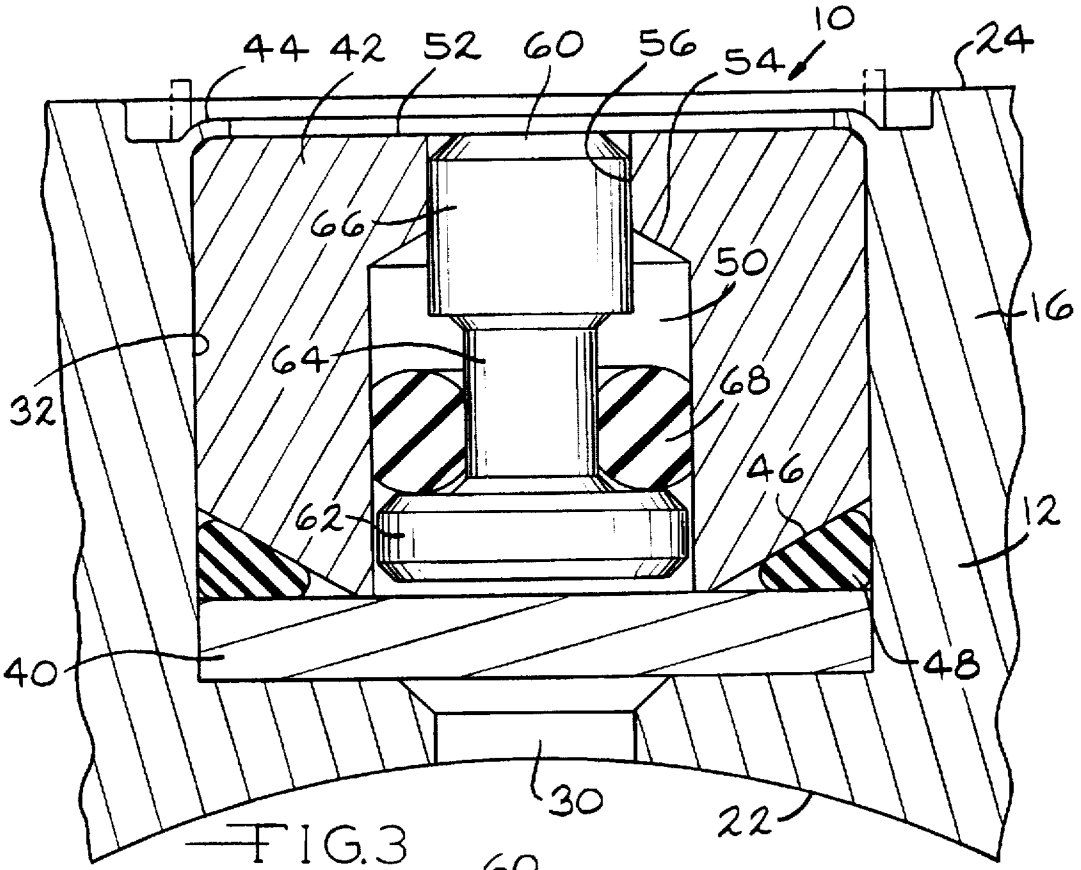
FIG. 3 .is a cross-sectional view of a first embodiment hose fatigue indicator according to the present invention in which the indicator pin is in the first position and the diaphragm is intact.
Figure 4:
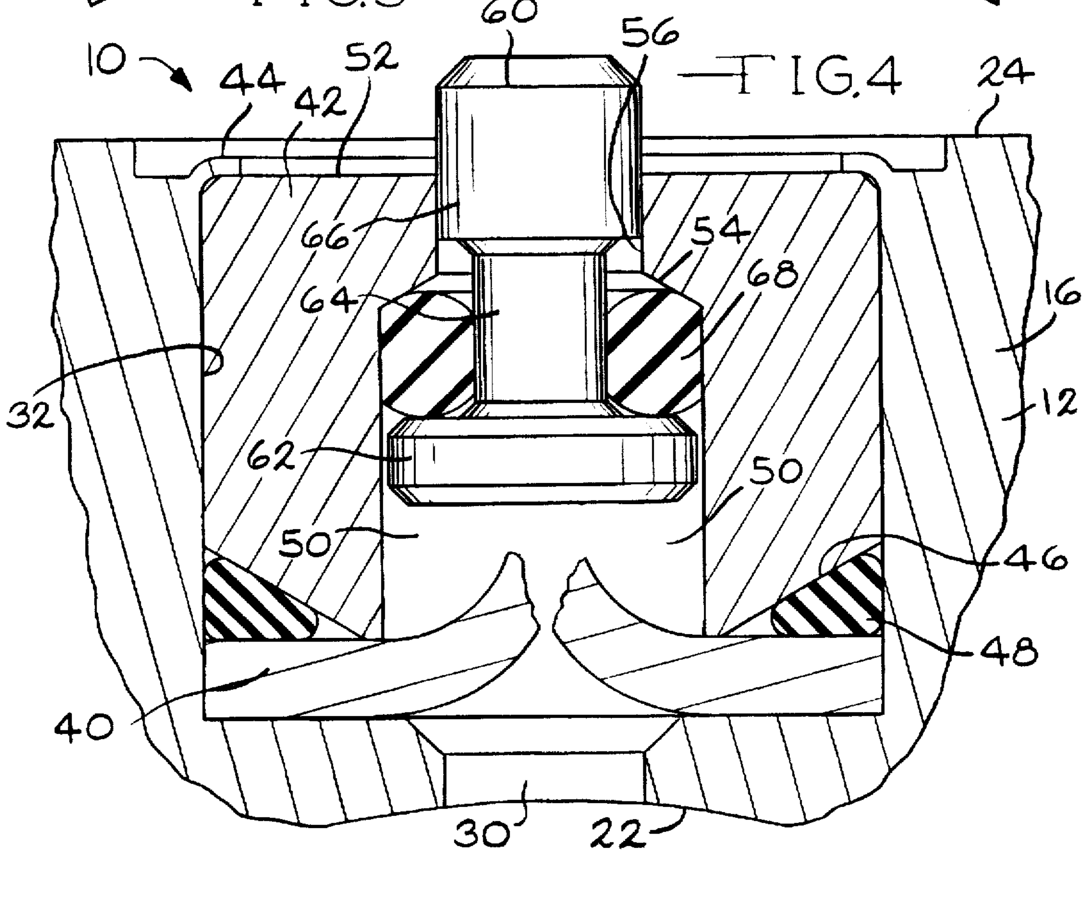
FIG. 4 is a view similar to the view of FIG. 3 in which the indicator pin is in the second position and the diaphragm has fractured.

As shown in FIGS. 3 and 4, the hex nut 16 of the fitting 12 defines an opening 30 and a chamber 32. The opening 30 extends from the interior surface 22 to the chamber 32. The opening 30 is circular. The opening 30 can have a variety of diameters depending on the application, with a diameter in the range from about 0.10 to about 1.0 inch being preferred.

Still referring to FIGS. 3 and 4, a fracturable diaphragm 40 is positioned in the chamber 32 adjacent the opening 30. When fluid is flowing through the hose and hose fitting, it enters the opening 30 and comes into contact with the diaphragm 40. Therefore, the diaphragm is subjected to the same environmental effects, such as pressure, temperature, and fluid cycles, as does the hose. The diaphragm can be scaled to accommodate a variety of hose materials, sizes and pressures. The scaling of the diaphragm is based on hose design specifications. The diaphragm is scaled so that it will fracture upon exceeding a predetermined fatigue limit due to exposure to the fluid. As used herein, the term "fatigue limit" means the maximum stress to which a material can be subjected without fatigue failure. The diaphragm 40 can be scaled so that it fails by fracturing when it is estimated that a hose has neared its minimum design life. The diaphragm 40 can be made from a variety of materials depending on the application. It has been found that metals, such as aluminum and steel, are especially suitable for the manufacture of the diaphragm 40. The diaphragm 40 can also be made of polymeric materials. It has also been found that the diaphragm 40 can be made of a ceramic material. The thickness of the diaphragm can vary depending on the material used to manufacture the diaphragm. The thickness of the diaphragm 40 is also dependent on the type of hose being used with the fitting 12. It has been found that a diaphragm having a thickness in the range from about 0.010 to about 0.050 inch is especially suitable.

Referring to FIGS. 1 through 4, the indicator 10 includes a housing 42 positioned in the chamber 32. In the present embodiment, the housing 42 is fixedly mounted in the chamber 32 by a swaged fitting 44. The housing 42 includes a chamfered surface 46 adjacent the diaphragm 40. The chamfered surface 46 contacts the diaphragm 40 to maintain the diaphragm within the chamber 32. As shown in FIGS. 3 and 4, an O-ring seal 48 is positioned between the chamfered surface 46 and the diaphragm 40. The seal 48 prevents the escape of fluid from the opening 30 to the exterior surface 24 of the fitting 12.

Referring to FIGS. 3 and 4, the housing 42 defines a cavity 50 that extends from the chamfered surface 46 to the outer surface 52 of the housing 42. The housing 42 defines an annular shoulder 54 adjacent an indicator pin opening 56 in the cavity 50. In the present embodiment, the housing 42 has a circular configuration. The diameter of the housing 42 can vary depending on the application. However, it has been found that the housing 42 and thus the overall diameter of the indicator 10 should be relatively small so that it can be mounted on a variety of hose fittings. It has been found that a housing 42 having a diameter in the range from about 0.10 to about 1.0 inch is especially suitable.

As shown in FIGS. 3 and 4, the indicator 10 includes an indicator pin 60 for indicating fracture of the diaphragm 40. In the present embodiment, the indicator pin includes a base 62, a shaft 64 and a head 66. The base 62 is adjacent the diaphragm 40. The head 66 extends into the indicator pin opening 56. The pin 60 is movable from a first position as shown in FIG. 3 to a second position as shown in FIG. 4. An O-ring seal 68 is positioned around the shaft 64 for preventing fluid from escaping through the indicator pin opening 56 to the exterior surface 24 of the fitting 12. As shown in FIG. 4, the upward movement of the indicator pin 60 is restricted by engagement of the base 62 with the O-ring seal 68 when the seal is in contact with the annular shoulder 54.

Figure 2:
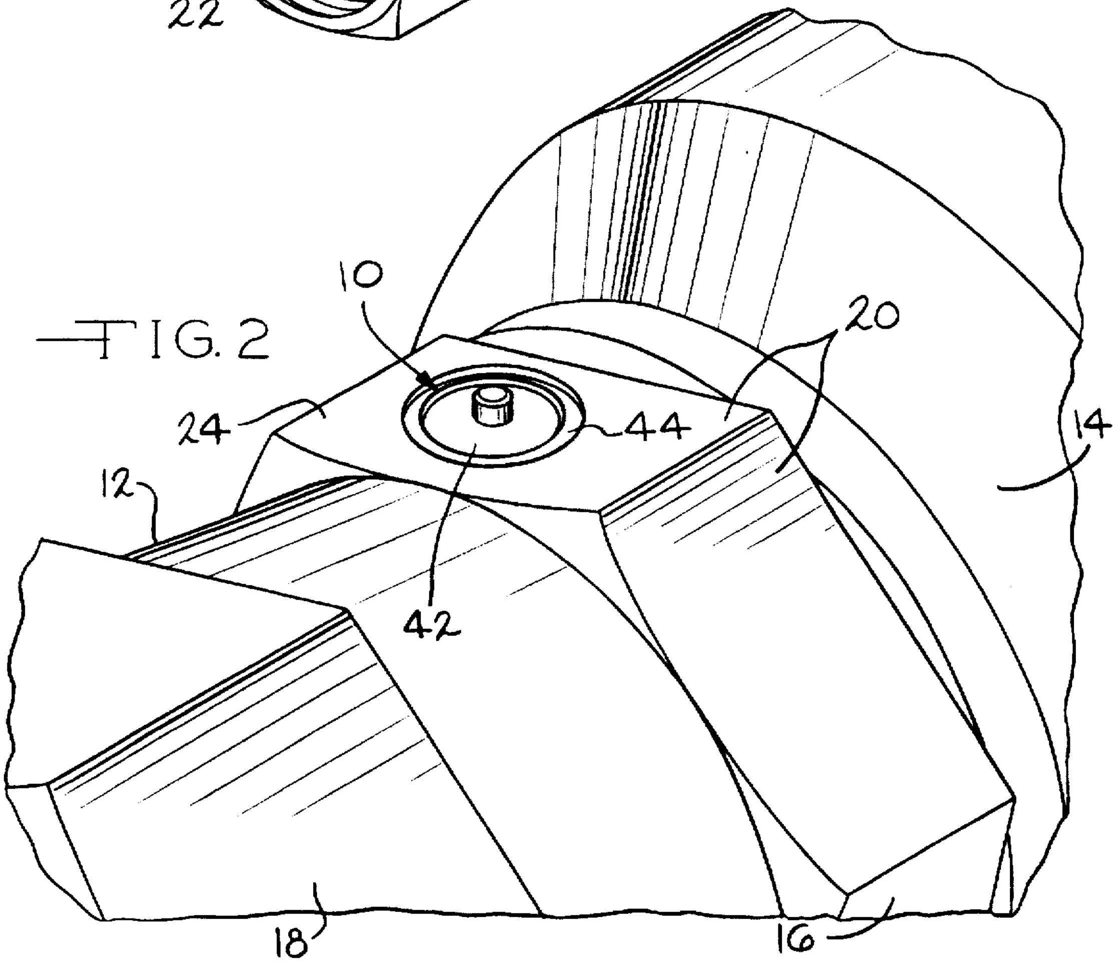
FIG. 2 is a detailed view of the hose fitting shown in FIG. 1 in which the indicator pin is in a second or up position.

Referring to FIGS. 2, 3 and 4, when the diaphragm 40 fractures upon exceeding a predetermined fatigue limit due to exposure to the fluid flowing through the fitting 12, fluid flows from the opening 30 into the cavity 50. The fluid acts on the base 62 of the pin 60 to cause the pin to move from the first position as shown in FIG. 3 to the second position as shown in FIG. 4. When the pin 60 is moved to the second position, the head 66 extends out of the housing 42 as shown in FIG. 2. The head 66 can be painted or otherwise treated to have a color different than the housing 42. The extension of the head 66 from the housing 42 provides a visual indication that the diaphragm 40 has fractured. This will indicate to an observer that the hose to which the fitting 12 is attached is reaching the end of its useful life, and should be replaced.

Figure 5:
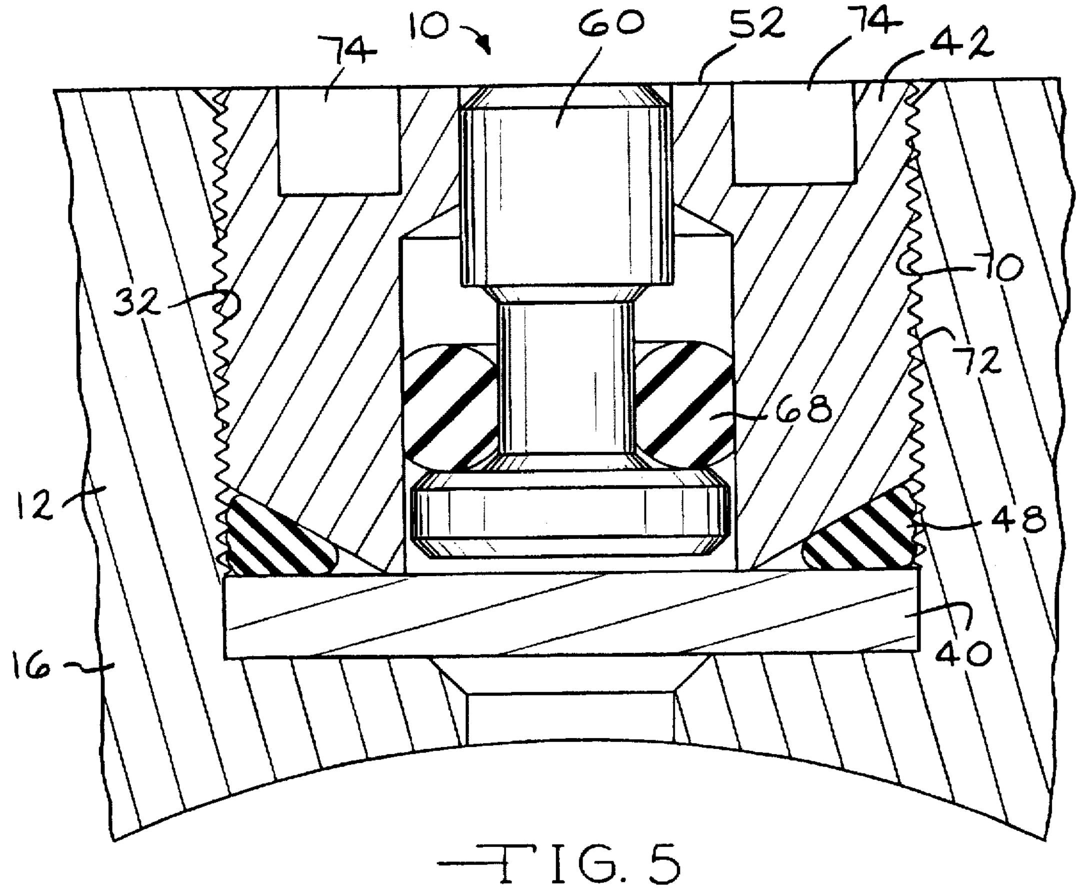
FIG. 5 is a cross-sectional view of a second embodiment hose fatigue indicator according to the present invention.

Referring to FIG. 5, a second embodiment of the present invention is shown. In this embodiment, the chamber 32 defined by the fitting 12 includes a plurality of threads 70. The housing 42 includes a plurality of mating threads 72. The housing 42 is screwed into the fitting 12 by a tool (not shown) that can be received by the recesses 74 defined on the outer surface 52 of the housing 42.

Figure 6:
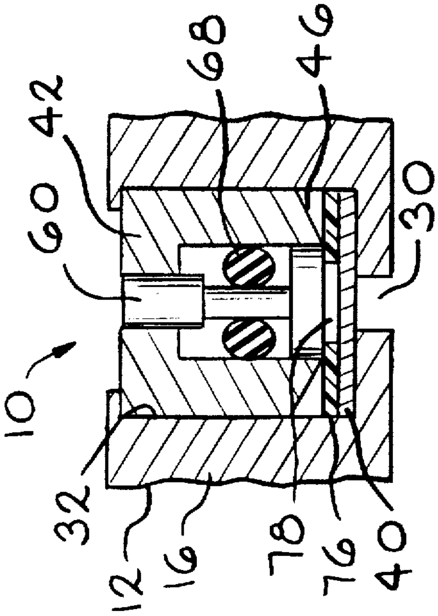
FIG. 6 is a cross-sectional view of a third embodiment hose fatigue indicator according to the present invention.

Referring to FIG. 6, a third embodiment of the present invention is shown. In this embodiment, a washer 76 defining an opening 78 is positioned between the chamfered surface 46 of the housing 42 and the diaphragm 40. The inclusion of the washer 76 eliminates the need for an O-ring seal between the chamfered surface 46 and the diaphragm 40.

Figure 7:
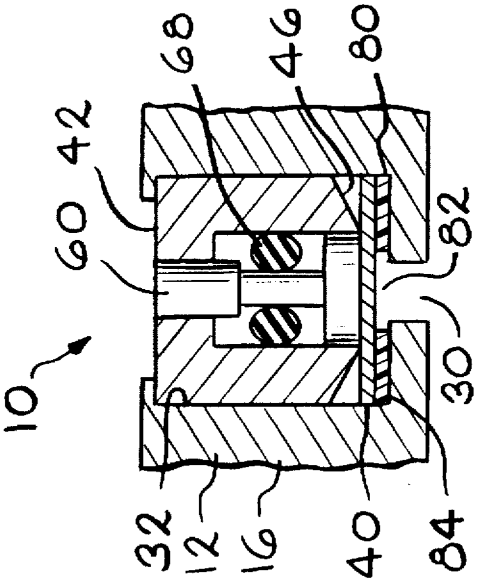
FIG. 7 is a cross-sectional view of a fourth embodiment hose fatigue indicator according to the present invention.

A fourth embodiment of the present invention is shown in FIG. 7. In this embodiment, a washer 80 defining an opening 82 is positioned between the diaphragm 40 and the lower wall 84 of the chamber 32. The inclusion of the washer 80 eliminates the need for an O-ring seal between the chamfered surface 46 and the diaphragm 40.

Figure 8:
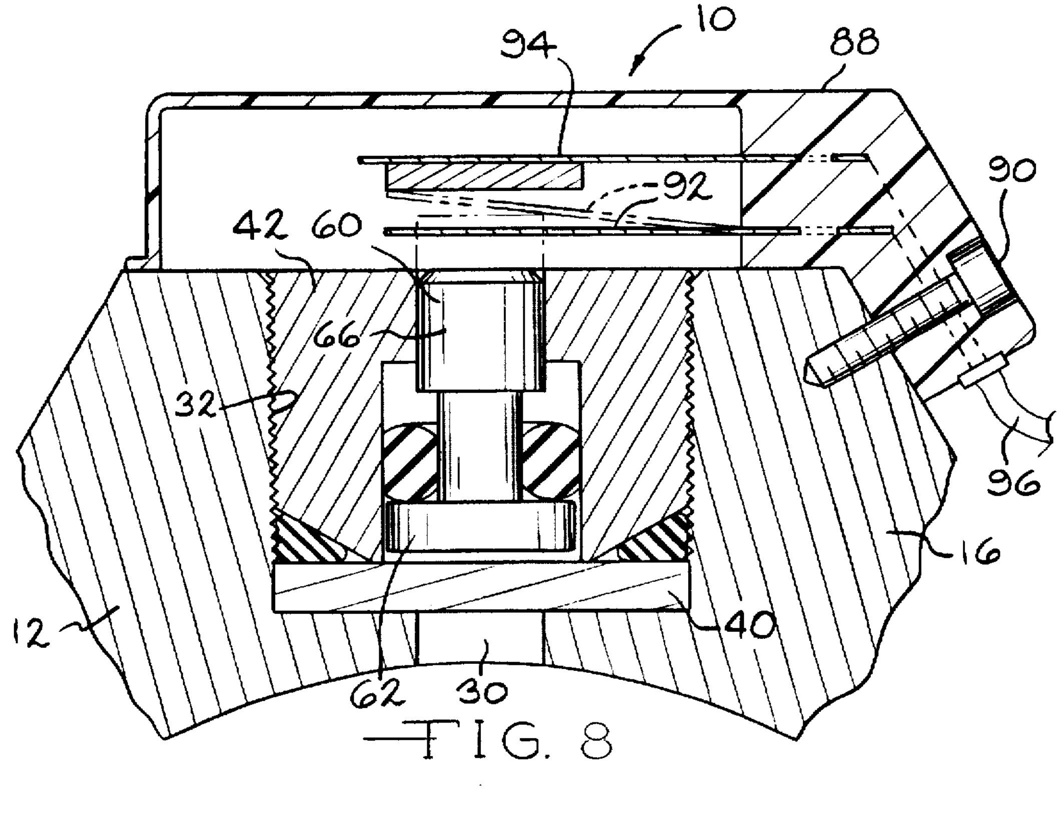
FIG. 8 is a cross-sectional view of a fifth embodiment hose fatigue indicator according to the present invention in which the indicator includes an electrical contact for providing a remote indication of the fracture of the diaphragm.

Referring to FIG. 8, a fifth embodiment of the present invention is shown. In this embodiment, an electrical contact mounting plate 88 is fixedly attached by a threaded screw 90 to the hex nut 16 over the housing 42 and indicator pin 60. A first contact 92 and a second contact 94 are mounted in substantially parallel arrangement on the mounting plate 88. As shown in FIG. 8, the first and second contacts 92 and 94 are in communication with a wire 96. The wire 96 is in communication with, for example, a power source and an electric light (not shown). When the diaphragm 40 fractures, the indicator pin 60 is moved by the fluid acting on the base 62 from the first position to the second position as previously described. Movement of the pin 60 to the second position causes the head 66 to move the first contact 92 into engagement with the second contact 94. This completes the electrical circuit with the wire 96 causing the electric light to shine thus providing a visual indication that the diaphragm 40 has fractured.

Figure 9:
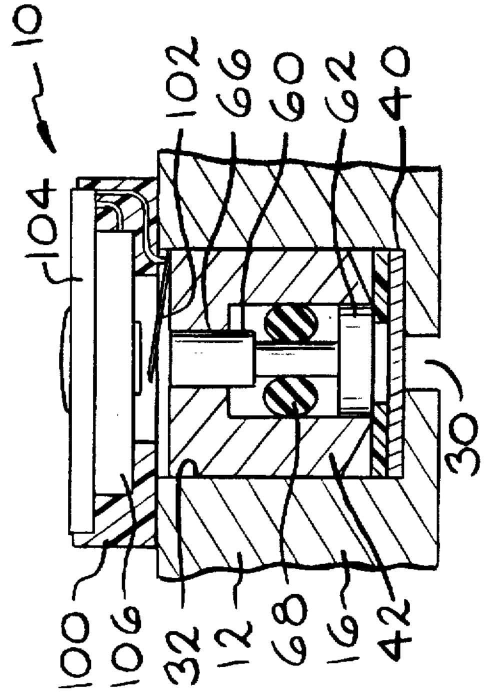
FIG. 9 is a cross-sectional view of a sixth embodiment hose fatigue indicator according to the present invention in which the indicator includes a speaker element to provide an auditory indication of the fracture of the diaphragm.

A sixth embodiment of the present invention is shown in FIG. 9. In this embodiment, a speaker and battery mounting plate 100 is fixedly attached to the hex nut 16 of the fitting 12 over the housing 42 and indicator pin 60. The speaker and battery mounting plate 100 includes a speaker contact 102 in communication with a speaker element 104. A battery 106 is positioned between the speaker contact 102 and the speaker element 104. When the diaphragm 40 is fractured, the fluid flowing through the fitting 12 acts on the base 62 of the indicator pin 60 to cause the pin to move from the first position to the second position as previously described. When the indicator pin 60 moves to the second position, the head 66 moves the speaker contact 102 into engagement with the battery 106. This completes the electrical circuit thereby actuating the speaker element 104 to provide an auditory indication that the diaphragm 40 has fractured.

Figure 10:
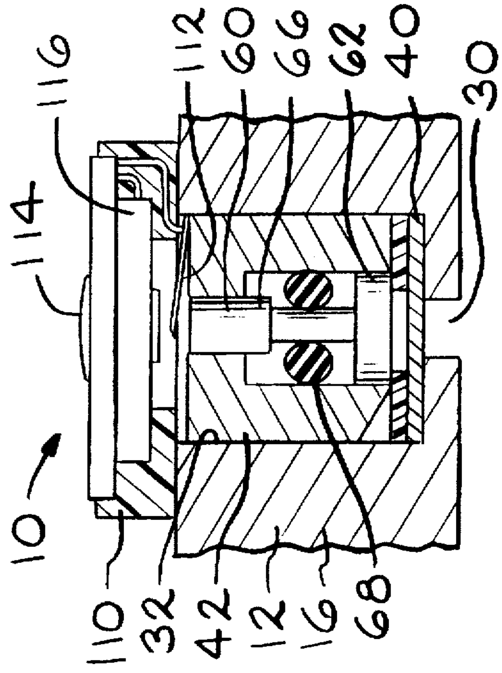
FIG. 10 is a cross-sectional view of a seventh embodiment hose fatigue indicator according to the present invention in which the indicator includes a light emitting diode (LED) to provide a visual indication of the fracture of the diaphragm.

Referring to FIG. 10, a seventh embodiment of the present invention is shown. In this embodiment, a light and battery mounting plate 110 is fixedly attached to the hex nut 16 of the hose fitting 12 over the housing 42 and the indicator pin 60. The light and battery plate 110 includes a light contact 112 in communication with a light, such as a light emitting diode (LED) 114. A battery 116 is mounted between the light contact 112 and the LED 114. When the diaphragm 140 fractures, the fluid flowing through the hose fitting 12 acts on the base 62 of the indicator pin 60 to cause the pin to move from the first position to the second position as previously described. This causes the head 66 of the pin 60 to move the light contact 112 into engagement with the battery 116. This completes the electrical circuit to actuate the LED 114. This provides a visual indication that the diaphragm 40 has fractured.

Figure 11:
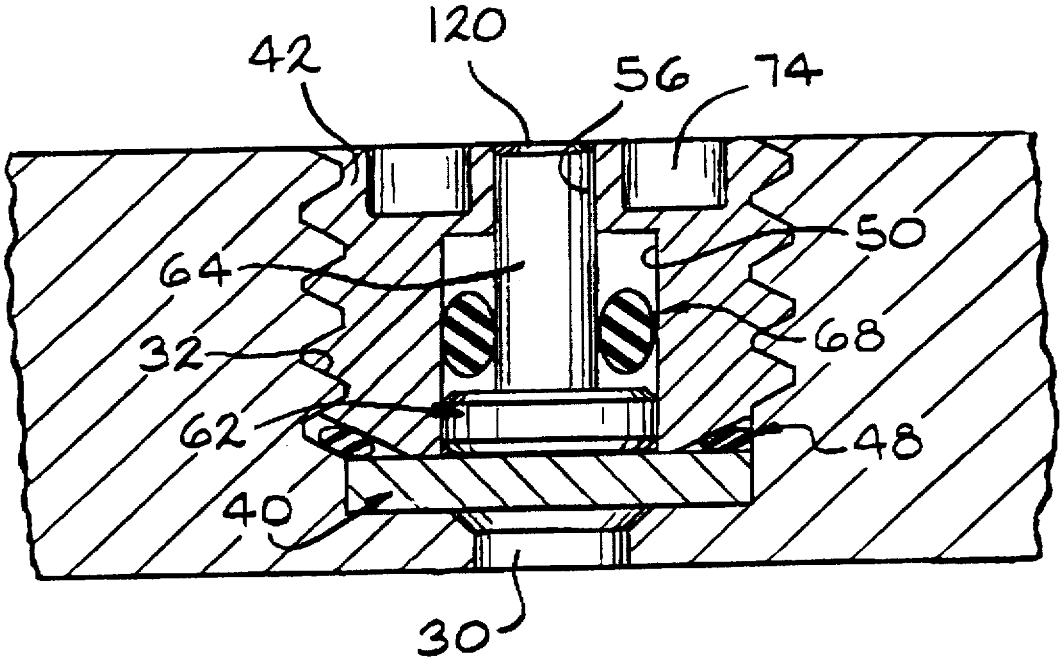
FIG. 11 is a cross-sectional view of an eighth embodiment hose fatigue indicator according to the present invention.

Referring to FIG. 11, an eighth embodiment of the present invention is shown. In this embodiment, the shaft 64 of the indicator pin 60 extends from the base 62 through the indicator pin opening 56 of the cavity 50. When the indicator pin 60 moves from the first position to the second position as described above, an end 120 of the shaft 64 can provide an indication that the diaphragm 40 has fractured. The end 120 acts in a manner similar to the head 66 described above.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A hose fatigue indicator, comprising:

a hose fitting including an interior surface and an exterior surface, said fitting defining an opening and a chamber, said opening extending from said interior surface to said chamber;

a fracturable diaphragm positioned in said chamber adjacent said opening, said diaphragm being in contact with fluid flowing along said interior surface of said fitting through said opening, said diaphragm fracturing upon exceeding a predetermined fatigue limit due to exposure to said fluid; and an indicator having a housing positioned in said chamber, said housing defining a cavity, an indicator pin movably positioned in said cavity adjacent said diaphragm, said pin being movable between a first position and a second position, when said diaphragm fractures, said fluid flowing through said opening acts on said pin to cause said pin to move from said first position to said second position to provide an indication that said diaphragm has fractured.

2. The invention of claim 1, wherein said hose fitting is metal.

3. The invention of claim 1, wherein said hose fitting includes a hex nut, said opening being defined by said hex nut.

4. The invention of claim 1, wherein said opening has a diameter in the range from about 0.10 to about 1.0 inch.

5. The invention of claim 1, wherein said diaphragm is metal.

6. The invention of claim 5, wherein said metal is aluminum.

7. The invention of claim 5, wherein said metal is steel.

8. The invention of claim 1, wherein said diaphragm is polymeric.

9. The invention of claim 1, wherein said diaphragm is ceramic.

10. The invention of claim 1, wherein said diaphragm has a thickness in the range from about 0.010 to about 0.050 inch.

11. The invention of claim 1, wherein seal means is positioned adjacent said diaphragm for preventing fluid from escaping said fitting.

12. The invention of claim 1, wherein said indicator pin has a base and a shaft, said base being adjacent said diaphragm, when said diaphragm fractures, said fluid flowing through said opening acts on said base to cause said pin to move from said first position to said second position.

13. The invention of claim 12, wherein seal means is positioned adjacent said shaft for preventing fluid from escaping said fitting.

14. The invention of claim 1, wherein said indicator further includes auditory means for providing an audible sound when said indicator pin moves from said first position to said second position.

15. The invention of claim 14, wherein said auditory means is a speaker.

16. The invention of claim 1, wherein said indicator further includes visual means for providing a visible signal when said indicator pin moves from said first position to said second position.

17. The invention of claim 16, wherein said visual means is a light.

18. The invention of claim 4, wherein said housing has a diameter in the range from about 0.10 to about 1.0 inch.

* * * * *